June 12, 1956   G. G. HERZL   2,749,781
UNIVERSAL DRILLING JIG

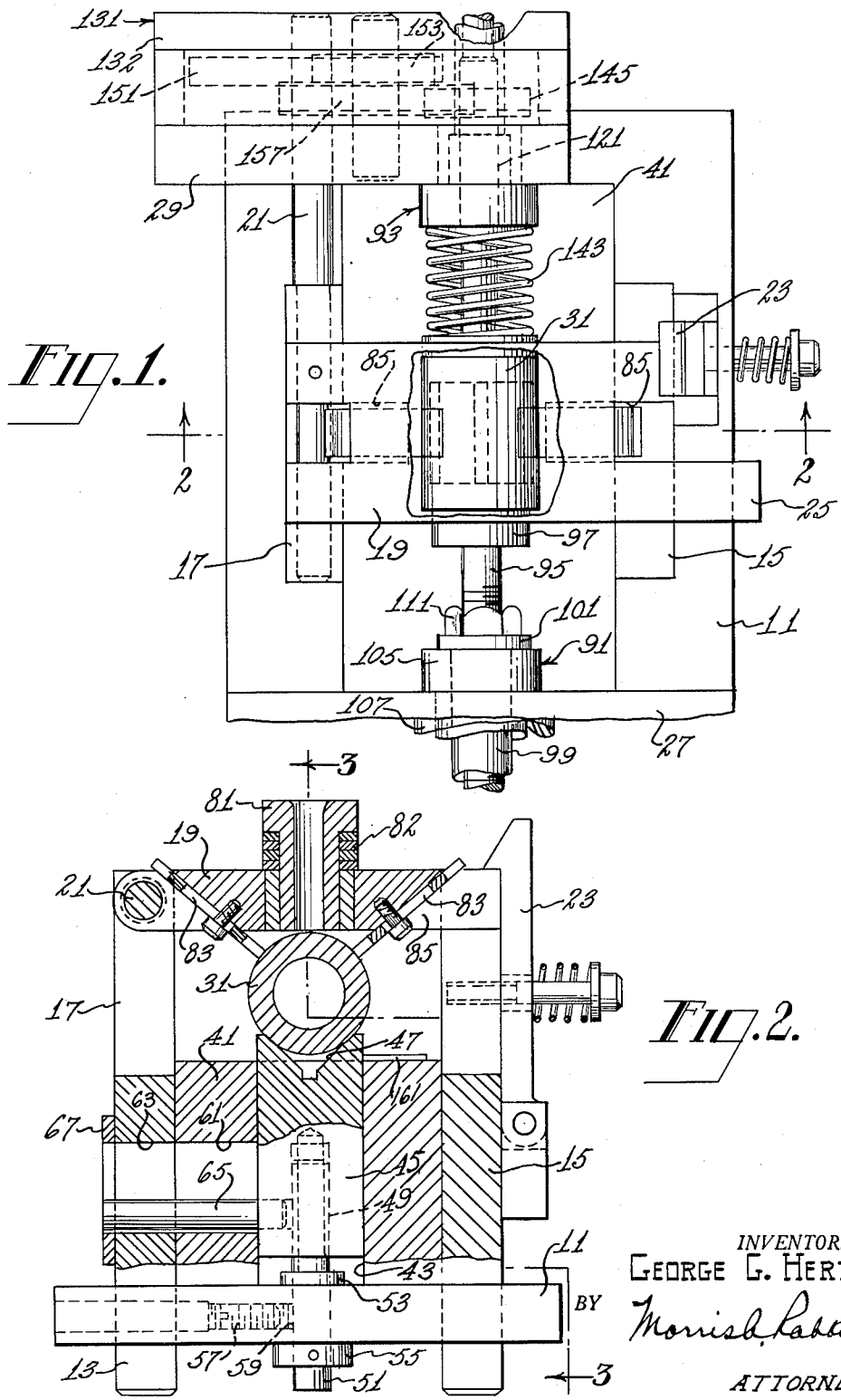

Filed June 1, 1955   3 Sheets-Sheet 2

INVENTOR.
GEORGE G. HERZL
BY
ATTORNEY

June 12, 1956 G. G. HERZL 2,749,781
UNIVERSAL DRILLING JIG
Filed June 1, 1955 3 Sheets-Sheet 3

INVENTOR.
GEORGE G. HERZL
BY
ATTORNEY

United States Patent Office 2,749,781
Patented June 12, 1956

2,749,781
UNIVERSAL DRILLING JIG

George G. Herzl, Philadelphia, Pa., assignor to Radio Corporation of America, a corporation of Delaware Application June 1, 1955, Serial No. 512,537

9 Claims. (Cl. 77—62)

This invention relates to drilling jigs, and more particularly to a universal drilling jig for drilling a plurality of radial holes in a cylindrical member.

In the present practice of drilling radial holes in a cylindrical member or workpiece, such as a collar or pinion, one or more jigs are made up for each size of workpiece to be drilled. The workpiece is then inserted in the jig, clamped, and the usual jig bushing is moved into operative position to guide the drill. For drilling the first hole, the jig has to be set in alignment with the drill and a single hole is drilled. If it is desired to drill more than one hole in a particular workpiece, the jig has to be indexed to another position and again aligned with the drill. Following the last drilling operation, the workpiece is unclamped. The practice, outlined above, may be reasonably efficient and economical where a large number of particular workpieces are to be drilled. However, in short runs involving a variety of sizes of workpieces, a set of jigs for each size becomes prohibitedly expensive to manufacture. It is desirable, therefore, to have a universal jig for drilling several sizes of workpieces.

An object of this invention is to provide a novel universal jig for the drilling of a plurality of radial holes in a cylindrical workpiece and which will accommodate a variety of sizes of workpieces.

Another object of this invention is to provide a novel universal jig wherein a plurality of radial holes may be drilled in a workpiece without removing the workpiece from the fixture.

A further object of this invention is to provide a novel universal jig which provides for the accurate positioning of a workpiece within the jig and which is of rugged construction.

A still further object of this invention is to provide a novel universal jig having indexing means for accurately setting up the jig to accommodate a given size workpiece.

A still further object of this invention is to provide a novel universal jig which permits a workpiece to be easily inserted in and removed from the fixture and which rigidly locks the workpiece when the jig is closed.

A still further object of this invention is to provide a novel universal jig having means for accurately rotating a workpiece through a fixed angle when the workpiece is locked in the fixture.

A universal jig in accordance with the present invention comprises a horizontal base having a plurality of vertical supporting members. A workpiece supporting V block is adjustable vertically with respect to the base. A member is supported on two of the vertical support members and is pivotally attached to one of the support members whereby it may be opened and closed. This member carries a drill guide bushing which is aligned over the V block when the member is closed. A pair of horizontally aligned clamping members are rotatably supported in opposite supporting members. Each of these clamping members is axially adjustable with respect to its supporting member. Additionally, one of the clamping members is movable axially with respect to its supporting member.

Means are provided for coupling the axially movable clamping member to the pivotally mounted member. When this member is opened, the clamping member is moved away from its opposing clamping member to permit the insertion and removal of a workpiece. When the member is closed, the movable clamping member is again moved toward its opposing member and positive clamping pressure is maintained by means of a spring. A lever is provided for rotating one of the clamping members through a fixed angle whereby the workpiece is rotated through a corresponding angle due to the clamping pressure between the clamping members.

The novel features of the invention, as well as additional objects and advantages thereof, will be understood more fully from the following description when read in connection with the accompanying drawings, in which:

Figure 1 is a plan view, partially broken away, of a drilling jig in accordance with the present invention;

Figure 2 is a view in side elevation, and partially in section, the section being taken along the line 2—2 of Figure 1 as viewed in the direction of the appended arrows;

Figure 3:
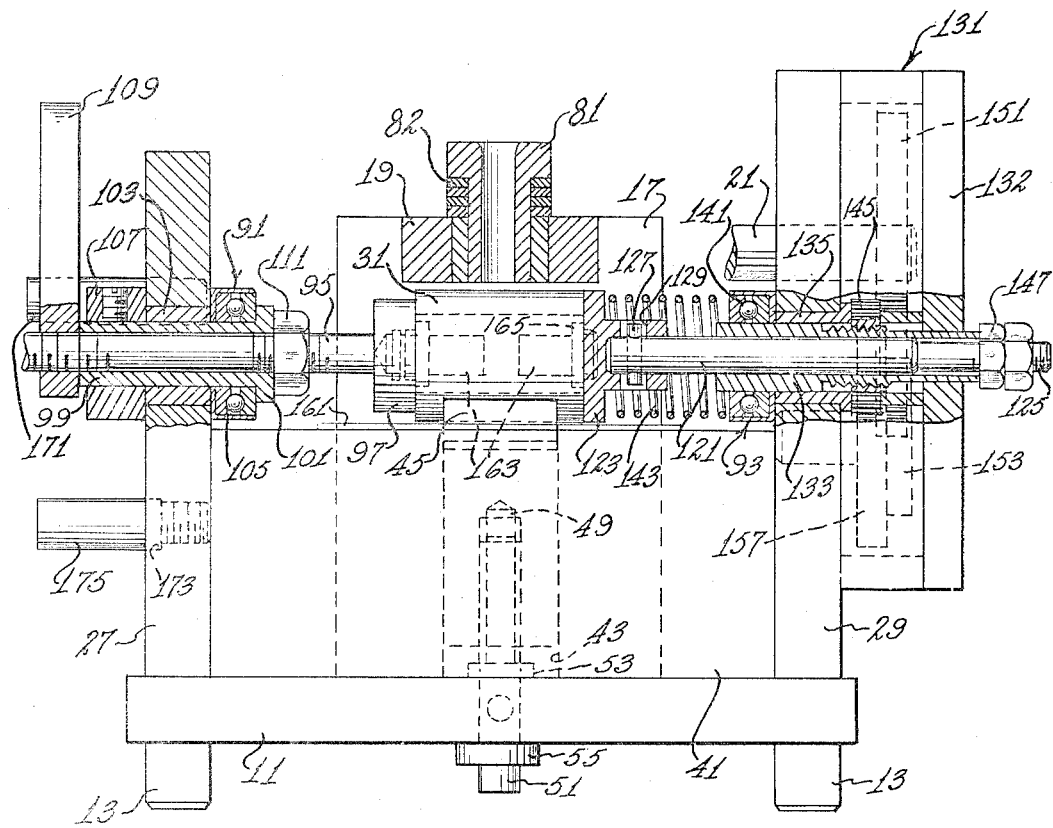
Figure 3 is a view in front elevation, and partially in section, the section being taken along the line 3—3 of Figure 2 as viewed in the direction of the appended arrows.

Referring now to the accompanying drawing in more detail, a universal drilling jig in accordance with the present invention is illustrated generally in Figures 1, 2 and 3. The frame for the jig includes a base plate 11 having four supporting feet 13. A front supporting member 15 and a rear supporting member 17 are provided for supporting a hinged cover 19. The cover 19 is fixed to a shaft 21 which is mounted in the rear supporting member 17 for rotation about a horizontal axis. In the closed position, the cover 19 rests on the front supporting member 15 and seats within a groove provided within the supporting member 15 to prevent sideward motion of the cover with respect to the member 15. A spring loaded latch 23 is pivotally attached to the front supporting member 15 and holds the cover 19 in the closed position. A finger 25 extends outwardly beyond the latch to permit the cover to be raised when the latch is released.

A pair of supporting members 27 and 29 extend upwardly from the sides of the base plate 11 for supporting rotatable spindles which clamp and rotate the workpiece, such as a collar 31 for example, which is to be drilled.

A block 41 is securely fixed to the base plate 11 and is contained within the above described vertical supporting members. This block is provided with a vertical aperture 43 extending through the block and having a square cross section. The aperture 43 is provided to receive a V block 45 which supports the work to be drilled. The V block 45 also has a square cross section and fits snugly within the aperture 43. Looking at the side of the V block (Figure 2), the block has a V groove 47 cut into its upper surface. This groove is adapted to retain cylindrical members of several dimensions from movement in a forward-backward direction.

The V block 45 is provided with a tapped hole 49 extending upwardly from its bottom surface. A screw 51 is mounted for rotation in an aperture in the base plate 11 and is retained in the aperture by means of collars 53 and 55. This screw 51 is received in the tapped hole 49 of the V block and provides for vertical adjustment of the V block relative to the base plate 11. With this adjusting means the V block may be raised or lowered to accommodate a great variety of sizes of workpieces. A set screw 57 is provided in a tapped hole 59 extending horizontally in the base plate 11 for locking the screw 51 against rotation when the position of the V block has been fixed with respect to the base plate.

Figure 6:
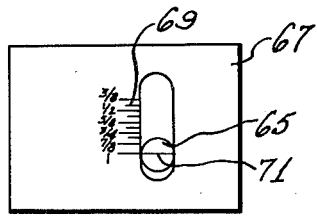
Figure 6 is a detail view of the index plate illustrated in Figure 2.

An elongated slot 61 is provided in the block 41 extending rearwardly from the aperture 43, the slot being elongated in a vertical direction. A corresponding slot 63 is provided in the rear supporting member 17 so that an opening is continuous through these members 41 and 17. A pin 65 is rigidly fixed to the V block 45 and extends rearwardly through the above described slot. An index plate 67 is fixed to the rear surface of the rear supporting member 17 and is provided with a slot corresponding to the slot in the rear supporting member. The index plate is marked with vertical graduations 69 (Figure 6) which are provided to indicate the diameter of the workpiece which is to be drilled. The end of the pin 65 which is flush with the surface of the index plate 67 is provided with a horizontally extending guide line 71 which is adapted to be aligned with the vertical graduations 69. As the V block 45 is raised or lowered by means of the screw 51, the guide line on the pin will move with respect to the vertical graduations. By this means the height of the V block may be set for any desired collar size.

A standard jig bushing 81 for accurately guiding the drill into the jig is mounted on the cover 19 and positioned so that it is centered over the V block 45 when the cover is in the closed position. The bushing is provided with a radially extending flange for supporting the bushing within the cover 19. A number of washers 82 may be positioned beneath the flange to provide for vertical adjustment of the bushing with respect to the cover so that the bushing may be positioned close to the workpiece being drilled. A pair of slide members 83 are adjustably mounted in slots 85 in the cover 19. When a workpiece 31 is placed in the V groove 47 these slide members 83 are adjusted downwardly to engage the surface of the workpiece and are then secured to the cover 19. These members are provided to hold the workpiece within the V groove when a drill is removed after the drilling operation.

Referring now to Figure 3, the collar 31 is supported in a lateral direction by a pair of spindles 91 and 93. The spindle 91 comprises a threaded stud 95 having an integral bumper 97 at one end. The stud 95 extends through a sleeve 99 having an outwardly extending flange 101 at one end. The sleeve 99 extends through an aperture in the supporting member 27 and is supported for rotation therein by a bushing 103. The sleeve 99 is secured against axial movement with respect to the supporting member 27 by means of a thrust bearing 105 which is disposed on the sleeve 99 between the inner surface of the supporting member 27 and the inner surface of the flange 101. A collar 107 is secured to the sleeve 99 adjacent the external face of the supporting member 27 by means of a set screw, for example.

A lever 109 is attached to the outer end of the stud 95 and is provided for rotating the stud and bumper 97. The lever 109 is provided with a tapped hole at one end which receives the end of the stud 95. A nut 111 disposed on the stud 95 adjacent the bumper end is screwed against the inner end of the sleeve 99 to lock the bumper assembly tightly with respect to the sleeve 99 so that the sleeve 99 and stud 95 will rotate together when actuated by the lever 109. The axial position of the stud 95, and therefore of the bumper 97, may be set by adjusting the nut 111 and lever 109 with respect to the sleeve 99 to accommodate a variety of workpiece sizes.

The spindle 93 comprises a shaft 121 extending through the supporting member 29, and having a bumper 123 attached at its inner end and a threaded portion 125 at its outer end. The bumper 123 includes a collar which slips over the end of the shaft 121. This collar is held on the shaft by means of a pin 127 which extends through a pair of slots 129 in the bumper collar and through the shaft. The pin is rigid with respect to the shaft. The slots 129 are so dimensioned as to prohibit rotation of the bumper with respect to the shaft but to permit a slight axial movement of the bumper with respect to the shaft.

Attached to the vertical supporting member 29, on its outer surface, is a housing 131 provided to support a gear train to be described later. A sleeve 133 extends through axially aligned apertures for axial movement with respect to the supporting member 29 and the housing wall 132. A bushing 135 is provided in the aperture in the supporting member 29 for supporting the sleeve 133. The sleeve 133 has a portion of larger external diameter at its inner end which is adapted for engagement with the internal surface of the bushing 135. The sleeve 133 also has a portion of smaller external diameter at its outer end which is externally threaded. This threaded portion of the sleeve 133 is provided with a longitudinal slot 137 (Figure 4) extending along a portion of its length. This slot is adapted to receive a pin 139 which is seated in the housing wall 132 and which extends into the slot 137 to prevent rotation of the sleeve 133 with respect to the frame but to permit axial movement of the sleeve 133 with respect to the frame.

A thrust bearing 141 is mounted over the internal end of the sleeve 133 and bears against the inner surface of the supporting member 29. A helical compression spring 143 is compressed between the thrust bearing 141 and the bumper 123 tending to urge the bumper and the shaft 121 inwardly or toward the bumper 97. The sleeve 133 is fixed axially by means of a pinion 145 which is provided with internal threads corresponding to the external threads on the sleeve 133. The pinion also is fitted on the threaded portion of the sleeve. This pinion 145 is contained between the supporting member 29 and the housing 131 and hence fixed against axial movement. In order to provide a stop for the inward movement of the shaft 121 with respect to the sleeve 133, a lock nut assembly 147 is attached to the outer threaded end of the shaft 121. The nut assembly 147 can be adjusted to set the spindle assembly to accommodate a variety of sizes of collars 31.

Figure 4:
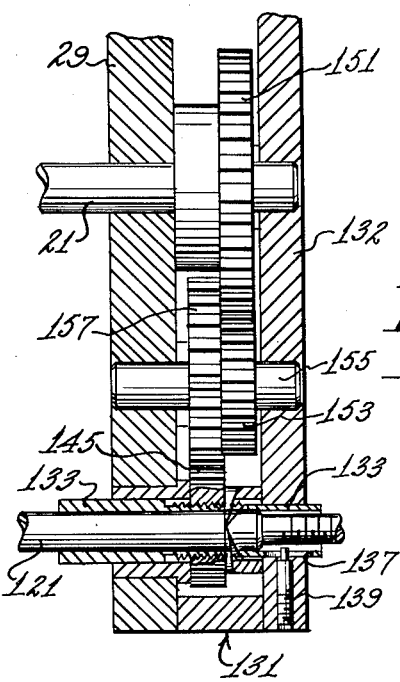
Figure 4 is a diagrammatic sectional view of the gear train for actuating the movable spindle.
Figure 5:
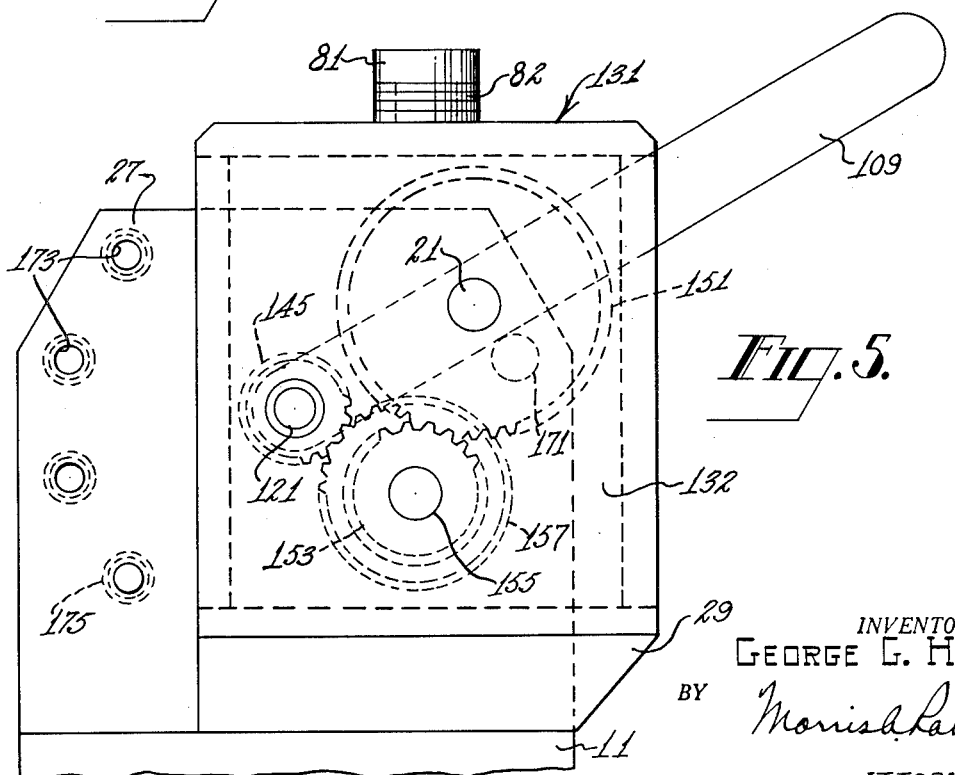
Figure 5 is a view in side elevation of the drilling jig of Figure 1.

It will be seen that when the pinion 145 is rotated in one direction, the sleeve 133, and hence the bumper 123, will be moved outwardly without rotation of the sleeve and bumper assemblies. The means for accomplishing this will now be described. Referring now to Figures 4 and 5 of the accompanying drawing, a gear train for rotating the pinion 145 is shown enclosed within the housing 131. Figure 4 is a schematic cross sectional view wherein the shafts of the gear train are shown in a common plane. A pinion 151 is rigidly fixed to the shaft 21 which extends through the supporting member 29 and the housing wall 132. The shaft 21 is the shaft to which the hinged cover 19 is also rigidly fixed. An idler pinion 153 is mounted on a shaft 155 extending between the supporting member 29 and the housing wall 132 to engage the pinion 151. A gear 157 is fitted over the collar of the idler pinion 153 and is rigidly fixed to the collar so that the gear 157 and idler pinion 153 rotate together. The gear 157 meshes with the pinion 145 which is carried on the sleeve 133. Through this gear train, the bumper 97 is moved outwardly and inwardly with respect to the workpiece when the cover 19 is opened and closed.

In setting up the spindles 91 and 93 for a workpiece of a given size, the cover 19 is closed and the shafts 95 and 121 are fixed axially within their respective sleeves 99 and 133 to accommodate the actual desired length of workpiece 31. In order to accomplish this adjustment without inserting an actual workpiece into the apparatus, an index plate 161 is mounted on the upper surface of the block 41 adjacent the bumpers 97 and 123. This plate 161 is provided with linear graduations to indicate distances between the end of the workpiece and the center of the holes to be drilled. These graduations may be read in reference to an index line or other reference point provided on the bumpers 97 and 123.

In order to provide for the accommodation of workpieces which are substantially smaller in diameter than the diameters of the bumpers 97 and 123, removable extension members are provided which extend inwardly from the inner faces of the bumpers. Each of these members comprises a pin 163 which is threaded at one end and adapted to be received in a threaded hole provided in the center of the bumper. A collar 165 is fixed to the pin 163 to provide a stop limit for the pin when it is screwed into the bumper. The distance between the inner surface of the bumper and the inner end surface of the pin should be fixed in relation to the scale readings on the plate 161 so that these readings may be utilized when either the bumper surface or the pin surface is used for engaging the workpiece. For example, if the scale graduations on the plate 161 are in inches and fractions thereof, the distance between the bumper surface and the pin surface might be one half inch so that a corrected reading may be easily made.

When the hinged cover 19 is now raised for the purpose of inserting a workpiece into the V groove 47, the bumper 123 is withdrawn from the bumper 97 by means of the gear train above described against the pressure of the spring 143. This permits the workpiece 31 to be easily inserted. When the cover is now closed to place the jig bushing 81 over the workpiece 31, the bumper 123 again moves in to clamp the workpiece between the bumpers 97 and 123. In order to eliminate the need for very close tolerances in fixing the distance between the bumpers, the bumper 123 has a slight axial movement with respect to the shaft 121 as already described. When the bumper assembly is moved inwardly to engage the workpiece 31, the bumper 123 will engage the workpiece 31 before the shaft 121 has completed its inward movement. With the continued movement of the shaft 121, the shaft moves into the bumper a slight amount permitted by the pin 127 and the slots 129, and a positive clamping pressure is maintained on the workpiece through the bumper 123 by means of the compression spring 143.

The lever 109 is provided for rotationally indexing the workpiece 31 after the workpiece has been positioned within the jig so that a plurality of radial holes may be drilled in the workpiece in fixed angular relation. Referring now to Figure 5, a plurality of pins are inserted into the supporting member 27 to provide stops for the lever 109. When the lever 109 is positioned for the drilling of the first aperture in the workpiece, it will be resting against a pin 171. A plurality of apertures 173 are provided to permit movement of the lever 109 to fixed angular positions about the axis of rotation of the lever 109. These apertures may be positioned at points 90°, 120°, 150°, and 180°, with respect to the starting position of the lever, for example. These apertures 173 are tapped to receive a threaded pin 175 which may be inserted in any one of these apertures in accordance with the position of the second hole desired to be drilled in the workpiece.

After the first hole is drilled the lever is rotated to its second stop position. The sleeve 99 to which the lever is attached will rotate freely with respect to the supporting member 27 and the shaft 121 will rotate freely within its supporting sleeve 133 in the supporting member 29. The bumper 123, the compression spring 143, and a portion of the thrust bearing 141 will rotate with the shaft 121. The clamping pressure provided between the bumpers 97 and 123 is sufficient to overcome the friction between the workpiece 31 and the V block 45 so that the workpiece will be accurately rotated the desired amount by the lever 109.

Figure 7:
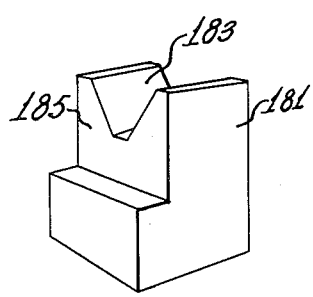
Figure 7 is a perspective view of an alternative form of workpiece supporting block which may be used in the jig of Figure 1.

In order to accommodate a pinion having a hub or collar in which it is desired to drill one or more holes, a modified form of V block 181 is provided. Such a block is illustrated in Figure 7. This block 181 has a base which is square in cross section similar to the block 45 already described. A V groove 183 is provided which is similar to the V groove 47 in the block 45. A notch 185 is provided on one face of the block which is at one end of the V groove 183. This notch will accommodate the gear portion of a pinion while the collar portion is resting in the V groove 183.

What is claimed is:

1. A universal drilling jig comprising a frame, a supporting block for a workpiece, means to provide for vertical adjustment of said block, laterally movable clamping members for securing said workpiece, said clamping members being rotatable with respect to said frame, a drill guide bushing, a member carrying said drill guide bushing, means pivotally supporting said member whereby said bushing is movable from an operative to an inoperative position, a sleeve supporting one of said clamping members, means for moving said sleeve axially with respect to said frame, means associated with said member for moving said sleeve away from said workpiece when said member is positioned to move said bushing to said inoperative position, and means for rotating one of said clamping members through a specified angle with respect to said frame whereby to rotate said workpiece through a corresponding angle.

2. A universal drilling jig comprising a frame, a supporting block for a workpiece, means to provide for vertical adjustment of said block, laterally movable clamping members for securing said workpiece, said clamping members being rotatable with respect to said frame, a drill guide bushing, a member carrying said drill guide bushing, means pivotally supporting said member whereby said bushing is movable from an operative to an inoperative position, said bushing being aligned over said supporting block in said operative position, a sleeve supporting one of said clamping members, a mechanism for moving said sleeve axially with respect to said frame, means associated with said member for controlling said mechanism when said member is pivoted about its supporting means, and means for rotating one of said clamping members through a specified angle with respect to said frame whereby to rotate said workpiece through a corresponding angle.

3. A universal drilling jig comprising a frame, a supporting block for a workpiece, means to provide for vertical adjustment of said block, laterally movable clamping members for securing said workpiece, said clamping members being rotatable with respect to said frame, a drill guide bushing, a member carrying said drill guide bushing, a shaft fixed to said member and pivotally supporting said member whereby said bushing is movable from an operative to an inoperative position, said bushing being disposed in vertical alignment with said supporting block in said operative position, a sleeve supporting one of said clamping members, a mechanism for moving said sleeve axially with respect to said frame, means coupling said mechanism and said shaft for moving said sleeve with respect to said workpiece when said member is positioned to move said bushing between said operative and said inoperative positions, and means for rotating one of said clamping members through a specified angle with respect to said frame whereby to rotate said workpiece through a corresponding angle.

4. A universal jig comprising a base, a V block for supporting a workpiece, means for providing for adjustment of said block vertically with respect to said base, vertically extending support members mounted on opposite sides of said base, a pair of horizontally aligned spindles rotatably carried in said support members, said spindles being supported for axial adjustment with respect to said support members, opposed clamping members mounted on said spindles, one of said clamping members being movable axially of its respective spindle, means for biasing said one clamping member toward its opposing clamping member, a cover supported above and parallel to said base, a drill guide bushing mounted on said cover and aligned over said block, a shaft fixed to said cover and providing a hinge therefor, means for axially moving one of said spindles, means for coupling said shaft and said last named means, and means for rotating one of said spindles through a specified angle whereby said workpiece is rotated through the same angle.

5. A universal jig comprising a base, a V block for supporting a workpiece, means for providing for vertical adjustment of said block with respect to said base, vertically extending support members mounted on opposite sides of said base, means in said support members for rotatably carrying a pair of horizontally aligned clamping spindles, said clamping spindles being supported for axial adjustment with respect to said carrying means, opposed clamping bumpers mounted on said spindles, one of said bumpers being movable axially of its respective spindle, means for biasing said one clamping bumper toward its opposing clamping bumper, a cover supported above and parallel to said base, a drill guide bushing mounted on said cover and aligned over said supporting block, a shaft fixed to said cover and providing a hinge therefor, means for axially moving one of said spindles with respect to its support member, means for coupling said shaft and said last named means whereby said movement of said one spindle is controlled by said cover, and means for rotating one of said spindles through a specified angle whereby said workpiece is rotated through the same angle.

6. A universal jig comprising a base, a V block for supporting a workpiece, means for providing for vertical adjustment of said block with respect to said base, index means for positioning said block with respect to said base, vertically extending support members mounted on opposite sides of said base, means associated with said support members for rotatably carrying a pair of horizontally aligned clamping spindles, said clamping spindles being supported for axial adjustment with respect to said carrying means, opposed clamping bumpers mounted on said spindles, one of said bumpers being movable axially of its respective spindle, means for biasing said one clamping bumper toward its opposing bumper, a cover supported above and parallel to said base, a drill guide bushing mounted on said cover and aligned over said base, a shaft fixed to said cover and providing a hinge therefor, means for axially moving one of said spindle carrying means with respect to its support member, said means including an internally threaded pinion carried on an externally threaded sleeve, means for coupling said shaft and said pinion, and means for rotating one of said spindles through a specified angle whereby said workpiece is rotated through the same angle.

7. A universal drilling jig comprising a frame, a vertically adjustable V block for supporting a workpiece, means for laterally clamping said workpiece comprising a fixed spindle and a movable spindle, said spindles being axially aligned and rotatable with respect to said frame, means for axially adjusting said spindles with respect to said frame, opposed clamping members attached to said spindles, a cover supported on said frame, a drill guide bushing mounted on said cover and aligned over said supporting block, a shaft fixed to said cover providing a hinge therefor, said movable spindle including a sleeve rotatably fixed and axially movable with respect to said frame, a portion of said sleeve being provided with external threads, an internally threaded pinion carried on said threaded sleeve, said pinion being fixed axially with respect to said frame, means coupling said pinion and said shaft whereby said sleeve is moved axially with respect to said frame, said movable spindle being withdrawn from said fixed spindle when said cover is opened, and means for rotating said fixed spindle through a fixed angle whereby said workpiece is rotated through a corresponding angle.

8. A universal drilling jig comprising a frame, a vertically adjustable V block for supporting a workpiece, means for laterally clamping said workpiece comprising a fixed spindle and a movable spindle, said spindles being axially aligned and rotatable with respect to said frame, means for axially adjusting said fixed spindle with respect to said frame, opposed clamping bumpers attached to said spindles, one of said bumpers being movable axially with respect to its spindle, means biasing said movable bumper toward said fixed bumper, a cover supported on said frame, a drill guide bushing mounted on said cover and aligned over said supporting block, a shaft fixed to said cover providing a hinge therefor whereby said cover is movable from a closed to an open position, a sleeve for supporting said movable spindle, said sleeve being rotatably fixed and axially movable with respect to said frame, means for axially adjusting said movable spindle with respect to said sleeve, a portion of said sleeve being provided with external threads, an internally threaded pinion carried on said threaded sleeve, said pinion being fixed axially with respect to said frame, means for rotating said pinion whereby said sleeve is moved axially with respect to said frame, said means comprising a gear train coupling said shaft and said pinion, said movable spindle being drawn away from said fixed spindle when said cover is opened, and means for rotating said fixed spindle through a fixed angle whereby said workpiece is rotated through a corresponding angle.

9. A universal drilling jig comprising a frame, a vertically adjustable V block for supporting a workpiece, means for laterally clamping said workpiece comprising a fixed spindle and a movable spindle, said spindles being axially aligned and rotatable with respect to said frame, means for axially adjusting said fixed spindle with respect to said frame, opposed clamping members attached to said spindles, means for indicating the position of said supporting block with respect to the axis of rotation of said spindles, means for indicating the position of said clamping members with respect to said frame, a cover supported on said frame, a drill guide bushing mounted on said cover and aligned over said supporting block, a shaft fixed to said cover providing a hinge therefor, said cover having an open and a closed position, a sleeve for supporting said movable spindle, said sleeve being rotatably fixed and axially movable with respect to said frame, a portion of said sleeve being provided with external threads, an internally threaded pinion carried on said threaded sleeve, said pinion being fixed axially with respect to said frame, means for rotating said pinion whereby said sleeve is moved axially with respect to said frame, said means comprising a gear train coupling said shaft and said pinion, said movable spindle being drawn away from said fixed spindle when said cover is opened, said opposed clamping members clamping said workpiece when said cover is closed, and means for rotating said fixed spindle through a fixed angle whereby said workpiece is rotated through a corresponding angle.

No references cited.